US009505455B1

(12) United States Patent
Brooks et al.

(10) Patent No.: US 9,505,455 B1
(45) Date of Patent: Nov. 29, 2016

(54) TRACK CHAIN ASSEMBLY FOR UNDERCARRIAGE SYSTEM

(71) Applicant: Caterpillar Inc., Peoria, IL (US)

(72) Inventors: Jennifer A. Brooks, Germantown Hills, IL (US); Roger L. Recker, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/716,169

(22) Filed: May 19, 2015

(51) Int. Cl.
  *B62D 55/21* (2006.01)
  *B62D 55/092* (2006.01)
  *B62D 55/06* (2006.01)

(52) U.S. Cl.
  CPC ............ *B62D 55/213* (2013.01); *B62D 55/06* (2013.01); *B62D 55/092* (2013.01)

(58) Field of Classification Search
  CPC ... B62D 55/21; B62D 55/213; B62D 55/092
  See application file for complete search history.

(56) References Cited

U.S. PATENT DOCUMENTS

| 1,289,409 A | 12/1918 | Davis | |
|---|---|---|---|
| 2,182,443 A * | 12/1939 | McAninch | F16G 13/06 198/728 |
| 4,530,546 A | 7/1985 | Meisel, Jr. | |
| 6,322,173 B1 * | 11/2001 | Maguire | B62D 55/21 305/185 |
| 6,371,577 B1 * | 4/2002 | Hasselbusch | B62D 55/08 305/100 |
| 6,382,742 B1 * | 5/2002 | Hasselbusch | E02F 9/02 305/100 |
| 7,661,774 B2 * | 2/2010 | Yamamoto | B62D 55/21 305/187 |
| 2008/0073972 A1 * | 3/2008 | Mulligan | B62D 55/0887 305/203 |
| 2009/0066154 A1 | 3/2009 | Maeda | |
| 2010/0146925 A1 | 6/2010 | Johannsen et al. | |
| 2014/0001827 A1 | 1/2014 | Kaufmann et al. | |
| 2014/0152086 A1 | 6/2014 | Meyer et al. | |

FOREIGN PATENT DOCUMENTS

DE   10113993   12/2001

* cited by examiner

*Primary Examiner* — Kip T Kotter

(57) ABSTRACT

A track chain assembly for an undercarriage system is provided. The track chain assembly includes a plurality of adjacent offset link sets connected to each other through a pin provided between oppositely disposed offset links wherein an axis of rotation is defined by the pin. The track chain assembly also includes a connection assembly coupled to a pair of the plurality of offset link sets. The connection assembly is configured to connect two ends of the track chain assembly together to form an endless loop. The connection assembly includes a first pair of straight links coupled to one of the pair of the plurality of offset link sets. The connection assembly also includes a second pair of straight links coupled to the first pair of straight links and the other of the pair of the plurality of offset link sets.

18 Claims, 4 Drawing Sheets

TRACK CHAIN ASSEMBLY FOR UNDERCARRIAGE SYSTEM

TECHNICAL FIELD

The present disclosure relates to a track chain assembly, and more particularly to the track chain assembly for an undercarriage system of a track type machine.

BACKGROUND

An undercarriage system of a track type machine includes a track chain assembly provided on either side of the machine. The track chain assembly is connected to surface engaging elements, known as track shoes, to propel the machine over the ground. The track chain moves as a result of engagement with a drive sprocket and the track shoes engage with the ground to propel the machine. The track chain includes a plurality of track links that are provided adjacent to each other in an endless loop. Each of the plurality of track links may be connected to an adjacent track link using a cartridge assembly.

U.S. Pat. No. 1,289,409 describes improvements in the link construction to which the tread feet or plates are fastened. Each link of the tread chain of two members has projecting studs by means of which the plates are secured thereto. The adjacent studs, between the two plates, overlap each other, and—all of the studs, have elongated bolt holes, whereby the relative position of the parts may be altered to take up any wear which may occur at the joints between the links.

SUMMARY OF THE DISCLOSURE

In one aspect of the present disclosure, a track chain assembly for an undercarriage system is provided. The track chain assembly includes a plurality of adjacent offset link sets connected to each other through a pin provided between oppositely disposed offset links wherein an axis of rotation is defined by the pin. Each of the offset links includes a center portion, a first extension portion extending in a first direction from the center portion, and a second extension portion extending in a second direction from the center portion. The first and second extension portions being offset from one another in an axial direction. The track chain assembly also includes a connection assembly coupled to a pair of the plurality of offset link sets. The connection assembly is configured to connect two ends of the track chain assembly together to form an endless loop. The connection assembly includes a first pair of straight links coupled to one of the pair of the plurality of offset link sets. The connection assembly also includes a second pair of straight links coupled to the first pair of straight links and the other of the pair of the plurality of offset link sets. The straight links of the first and second pairs of straight links have a substantially planar first side and a central portion having an increased thickness on a second side.

In another aspect of the present disclosure, a track chain assembly for an undercarriage system is provided. The track chain assembly includes a plurality of adjacent offset link sets connected to each other through a pin provided between oppositely disposed offset links wherein an axis of rotation is defined by the pin. Each of the offset links includes a center portion, a first extension portion extending in a first direction from the center portion, and a second extension portion extending in a second direction from the center portion. The first and second extension portions being offset from one another in an axial direction. The track chain assembly also includes a connection assembly coupled to a pair of the plurality of offset link sets. The connection assembly is configured to connect two ends of the track chain assembly together to form an endless loop. The connection assembly also includes a first pair of straight links coupled to one of the pair of the plurality of offset link sets. The first pair of straight links includes master links. The connection assembly also includes a second pair of straight links coupled to the first pair of straight links and the other of the pair of the plurality of offset link sets. The straight links of the first and second pairs of straight links have a substantially planar first side and a central portion having an increased thickness on a second side.

In another aspect of the present disclosure, a track type machine is provided. The track type machine includes an engine. The track type machine also includes an undercarriage system. The undercarriage system includes a plurality of adjacent offset link sets connected to each other through a pin provided between oppositely disposed offset links wherein an axis of rotation is defined by the pin. Each of the offset links includes a center portion, a first extension portion extending in a first direction from the center portion, and a second extension portion extending in a second direction from the center portion. The first and second extension portions being offset from one another in an axial direction. The undercarriage system also includes a connection assembly coupled to a pair of the plurality of offset link sets. The connection assembly is configured to connect two ends of the track chain assembly together to form an endless loop. The connection assembly includes a first pair of straight links coupled to one of the pair of the plurality of offset link sets. The connection assembly also includes a second pair of straight links coupled to the first pair of straight links and the other of the pair of the plurality of offset link sets. The straight links of the first and second pairs of straight links have a substantially planar first side and a central portion having an increased thickness on a second side.

Other features and aspects of this disclosure will be apparent from the following description and the accompanying drawings.

DETAILED DESCRIPTION

Figure 1:
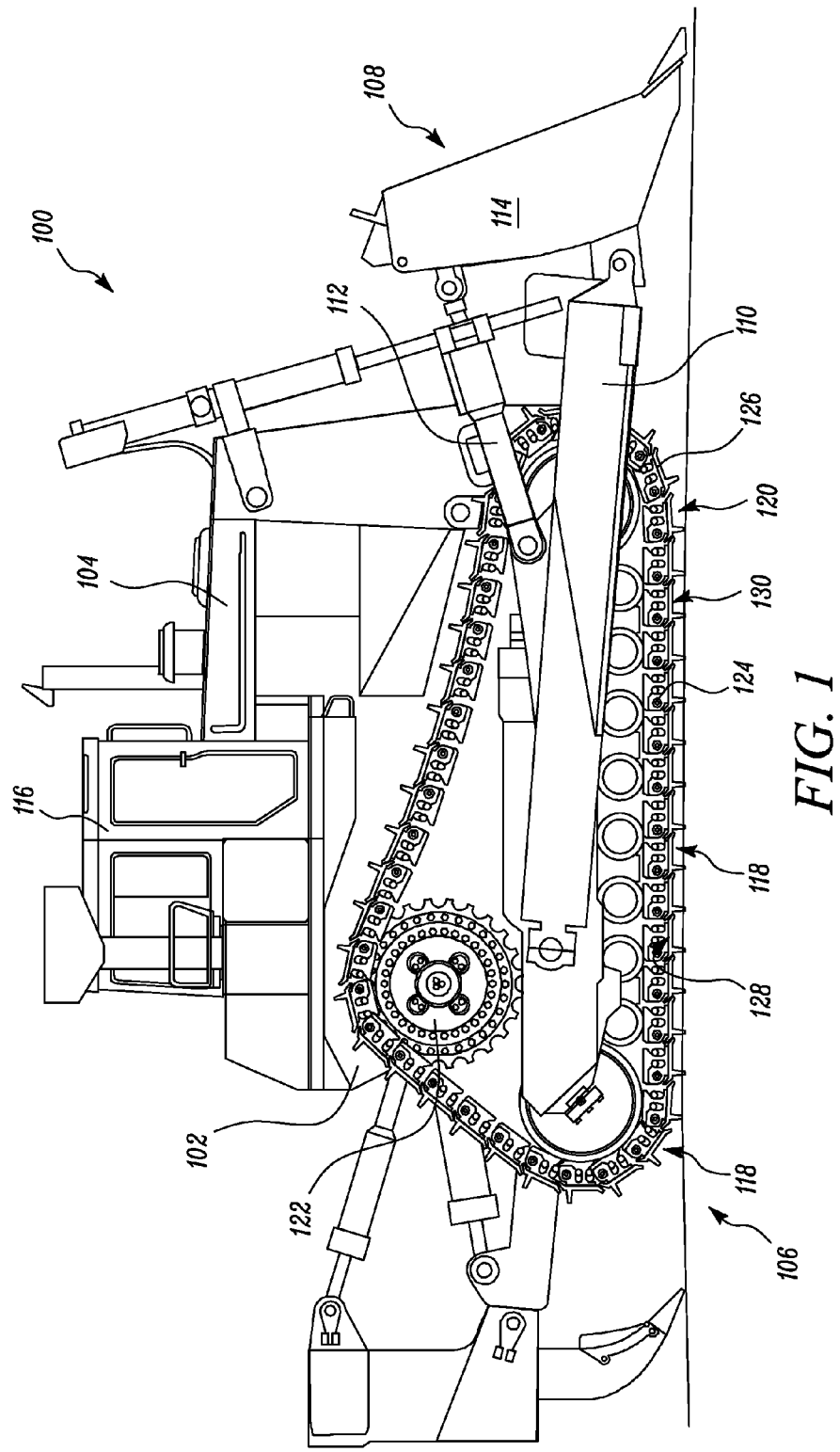
FIG. 1 is a side view of an exemplary machine, according to one embodiment of the present disclosure.

Wherever possible, the same reference numbers will be used throughout the drawings to refer to the same or the like parts. FIG. 1 illustrates an exemplary machine 100 according to one embodiment of the present disclosure. As illustrated, the machine 100 may embody a track-type tractor, which may also be referred to as a dozer. Alternatively, the machine 100 may include, but is not limited to, a track-type loader or any other tracked machine associated with mining, agriculture, forestry, construction, and other industrial applications.

As illustrated in FIG. 1, the machine 100 includes a chassis or a frame 102. An engine enclosure 104 houses a power source (not shown) to provide power to the machine 100. The machine 100 also includes a transmission system (not shown) and a propulsion system 106. In one embodiment, the power source may include, for example, a diesel engine, a gasoline engine, a gaseous fuel powered engine such as a natural gas engine, a combination of known sources of power or any other type of engine apparent to one of skill in the art. The transmission system may be communicably coupled to the power source. The transmission system may include coupling elements for transmitting a drive torque from the power source to the propulsion system 106.

The machine 100 may include a load lifting assembly 108 having a lift arm 110, one or more hydraulic actuators 112 and a ground engaging tool 114, such as a blade or bucket. The ground engaging tool 114 is configured to collect, hold and convey material and/or heavy objects on the ground. The hydraulic actuators 112 may be configured to effectuate the movement of the load lifting assembly 108 based on an operator command provided by an operator of the machine 100. The operator command may be received through various input devices present within an operator cabin 116 of the machine 100.

Figure 2:
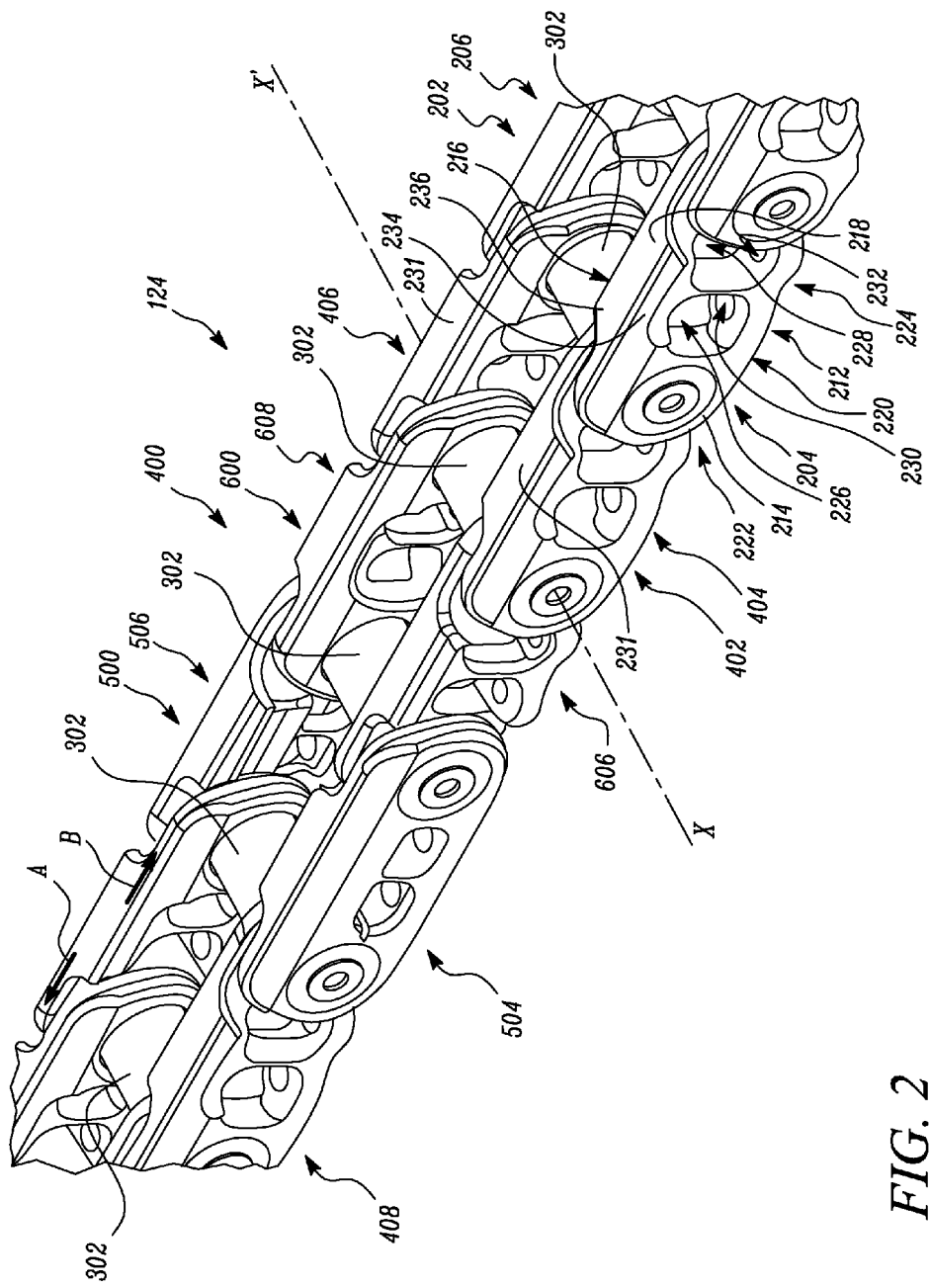
FIG. 2 is a perspective view of a portion of an exemplary track chain assembly for an undercarriage system, according to one embodiment of the present disclosure.

As illustrated in FIG. 1, the propulsion system 106 may include an undercarriage system 118 to propel the machine 100 over the ground. The undercarriage system 118 may include two separate continuous tracks 120, one on either side of the machine 100 (only one of which is shown in FIG. 1). Each of the tracks 120 may be driven by the power source via one or more sprockets 122. In addition, the tracks 120 include a track chain assembly 124. A portion of the track chain assembly 124 is shown in FIG. 2, and will be explained in detail later in this section. The tracks 120 include a plurality of track shoes 126, each of which are configured to selectively engage a surface, e.g., the ground. The track shoe 126 may include a base portion 128 and a ground-engaging surface 130. Geometric features of the track shoes 126 are such that the track shoes 126 may be connected to and guided on top of the respective track chain assembly 124.

Referring to FIG. 2, the track chain assembly 124 includes a number of offset link sets 202. Each of the offset link sets 202 includes a pair of offset links 204, 206 that are oppositely disposed and spaced apart from each other. Further, the offset link sets 202 are provided adjacent to and pivotably connected to one another to form a chain. The adjacent offset link sets 202 may be connected to each other through a pin 304 associated with a cartridge assembly 302 disposed between the oppositely disposed offset links 204, 206.

Each of the offset links 204, 206 have similar design and geometric features. The design of the offset link 204 will now be described in detail. However, it should be noted that the following description of the offset link 204 is also applicable to the offset link 206. The offset link 204 includes a body member 212 having a first side 214 and a second side 216. The body member 212 includes an upper rail surface 218 and a lower shoe mounting surface 220.

The offset link 204 further includes a first bore 226 and a second bore 228. However, it should be appreciated that a single bore can be utilized in, for example, a strutless link design. The first and second bores 226, 228 are interposed between a first aperture and a second aperture that are provided at a first end 222 and a second end 224 of the offset link 204 respectively. The offset link 204 also includes a first bolt hole 230 and a second bolt hole 232 defined on the body member 212. The first and second bolt holes 230, 232 are positioned within and extend generally perpendicular to the first and second bores 226, 228, respectively.

The offset link 204 includes a central portion 231 at the location of the first and second bores 226, 228 having a first width. The offset link 204 also includes a first extension portion 234 extending in a first direction "A" from the central portion 231, and a second extension portion 236 extending in a second direction "B" from the central portion 231, the first and second extension portions 234, 236 extending in opposite directions. The first and second directions "A", "B" are generally perpendicular to an axis of rotation X-X' of the pin 304.

The first and second extension portions 234, 236 may each have a width less than the width of the central portion 231. In certain embodiments, the first and second extension portions 234, 236 may have a width that is less than but approximately equal to half of the width of the central portion 231. The first extension portion 234 is positioned at an outboard side of the offset link 204 such that the first side 214 of the offset link 204 is substantially continuous between the central portion 231 and the first extension portion 234. The second extension portion 236 is positioned at an inboard side of the offset link 204 such that the second side 216 of the offset link 204 is substantially continuous between the central portion 231 and the second extension portion 236.

The offset nature of the first and second extension portions 234, 236, wherein the first and second extension portions 234, 236 are positioned offset from one another in an axial direction defined by the axis of rotation X-X', allows adjacent offset links to be nested together. The offset links 204 can therefore be positioned in a consistent orientation around the track chain assembly 124 with the first extension portion 234 of one offset link 204 nesting with the second extension portion 236 of another offset link 404 (see FIG. 2).

The first aperture of the offset link 204 is aligned with the second aperture of the offset link 404 of an offset link set 402. Further, the first and second apertures of the offset links 204, 404 are aligned with the apertures of the corresponding offset links 406, 206 respectively, in order to receive the cartridge assembly 302.

Figure 3:
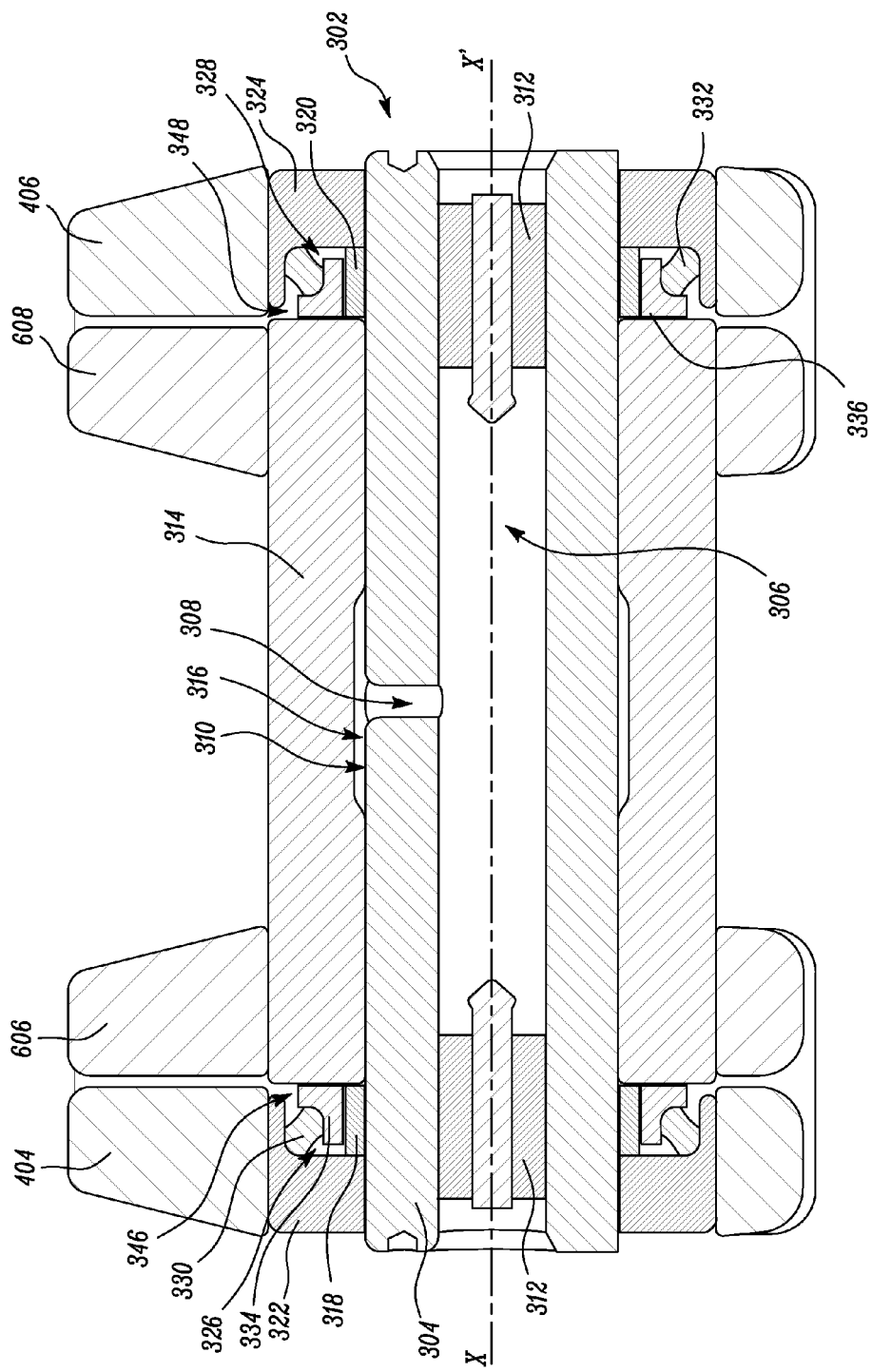
FIG. 3 is a cross sectional view of a cartridge assembly associated with the track chain assembly of FIG. 2.

The cartridge assembly 302, as shown in FIG. 3, is used to pivotably connect adjacent links to form the track chain assembly 124. A cross-sectional view of the cartridge assembly 302 is shown in FIG. 3. The cartridge assembly 302 shown in the accompanying figure is used to pivotably connect a second pair of straight links 600 with the offset link set 402. However, it should be noted that the same cartridge assembly 302 may be used to couple all the links sets to form the track chain assembly 124.

The cartridge assembly 302 includes the pin 304. The pin 304 may have a lubrication reservoir 306 defined therein. The lubrication reservoir 306 is in fluid communication with a lubrication channel 308. The lubrication channel 308 leads to an outer surface 310 of the pin 304. A pair of stoppers 312 is located within the lubrication reservoir 306 to prevent a lubricant, such as oil, from leaking out of the lubrication reservoir 306.

The cartridge assembly 302 also includes a bushing 314 positioned concentrically around the pin 304. The bushing 314 is embodied as a substantially cylindrical bushing. The bushing 314 may be coupled between oppositely disposed links, such as the links 606, 608 using a press fit. Alternatively, soldering, welding, or brazing may also be used to couple the bushing 314 with the links. The bushing 314 has a passageway 316 defined therethrough. The pin 304 is received through the passageway 316 of the bushing 314. The lubrication channel 308 is in communication with the passageway 316. In operation, oil disposed within the lubrication reservoir 306 is advanced through the lubrication channel 308 to the outer surface 310 of the pin 304 thereby forming a lubricated interface between the pin 304 and the bushing 314.

The cartridge assembly 302 also includes a first collar 322 and a second collar 324. Each of the first and second collars 322, 324 include a seal groove 326, 328 that is concentric with the axis of rotation X-X'. A preload member 318, 320 is positioned within the seal groove 326, 328. Further, the cartridge assembly 302 includes a first sealing arrangement 346 and a second sealing arrangement 348 provided within the first and second collars 322, 324 respectively. Each of the first and second sealing arrangements 346, 348 respectively include a load ring 330, 332 and a seal member 334, 336 positioned in the seal grooves 326, 328 so that the load ring 330, 332 urges the seal member 334, 336 in the axial direction outward from the seal groove 326, 328. In one example, the load rings 330, 332 may be made from, for example, a polycarbonite compound and the seal members 334, 336 may be made from, for example, polyurethane compound. However, the load rings 330, 332 and the seal members 334, 336 may be made from other materials known in the art, without limiting the scope of the present disclosure. The sealing arrangements 346, 348 cooperate to hold the oil within the cartridge assembly 302 while restricting debris such as sand, rocks, etc. to mix with the oil.

Figure 4:
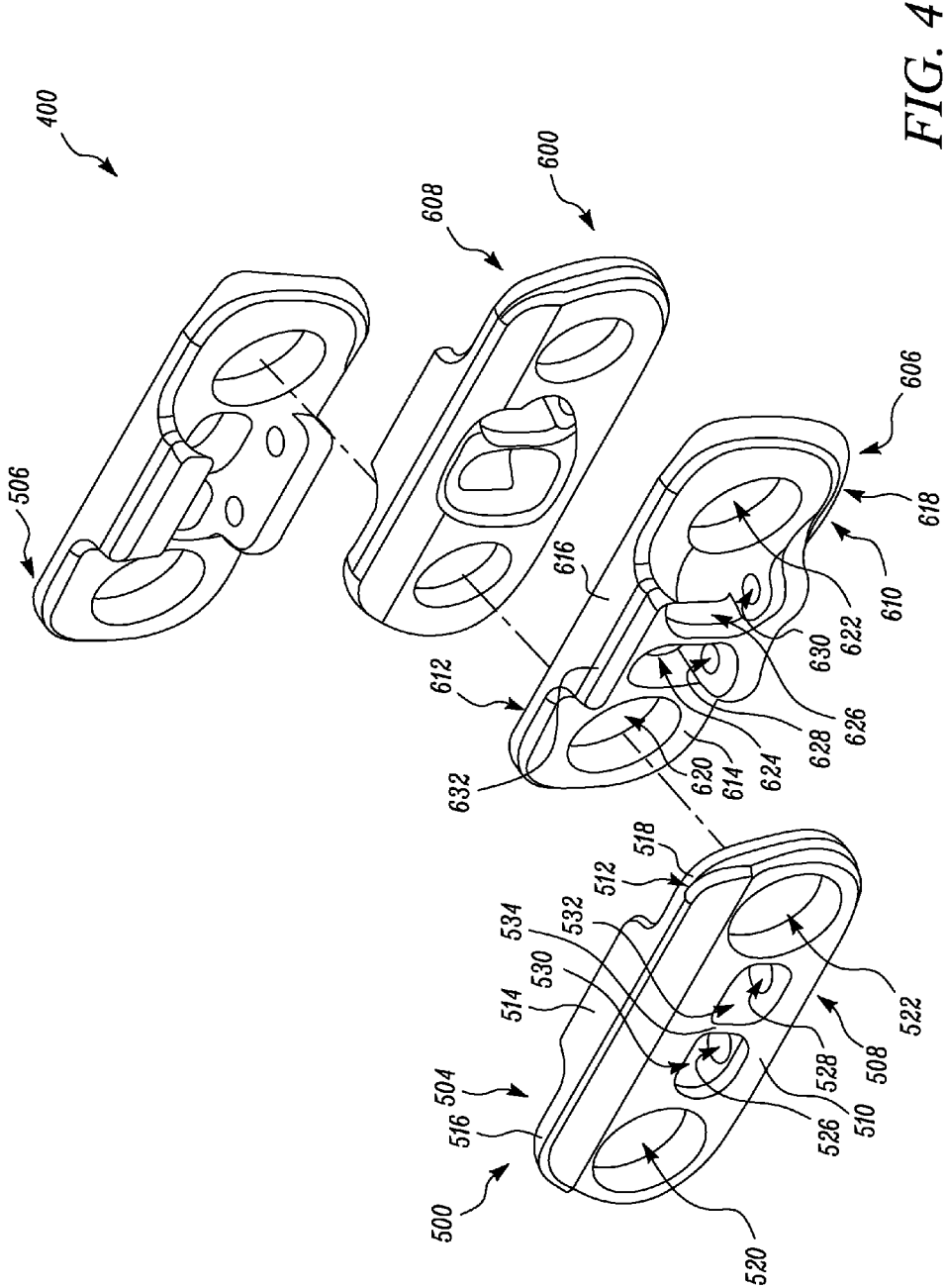
FIG. 4 is an exploded view of a connection assembly associated with the track chain assembly of FIG. 2, according to one embodiment of the present disclosure.

The track chain assembly 124 also includes a connection assembly 400. The connection assembly 400 is coupled to a pair of the offset link sets 402, 408 at each end of the track chain assembly 124 to form a continuous loop. Referring to FIGS. 2 and 4, the connection assembly 400 includes a first pair of straight links 500. FIG. 4 is an exploded view of the connection assembly 400. The cartridge assembly 302 is not shown in FIG. 4 for clarity purposes. One end of the first pair of straight links 500 is coupled to the offset link set 408. In one example, each of the first pair of straight links 500 may be a master link. For example, the first pair of straight links 500 includes a first master link 504 and a second master link 506. The first and second master links 504, 506 have a reversible link design. Alternatively, the first and second master links 504, 506 may have a non-reversible link design.

The first and second master links 504, 506 may be substantially similar and the following description of the first master link 504 is equally applicable to the second master link 506. Referring to FIG. 4, the first master link 504 includes a body member 508 having a first side 510 and a second side 512 spaced apart from the first side 510. The first side 510 may be substantially planar, while the second side 512 may be contoured to accommodate the connection between the first master link 504 and the offset link set 408. The second side 512 may include a relatively thicker middle portion 514 and relatively thinner left portion 516 and right portion 518 of the body member 508.

Each of the straight links 500 includes a first aperture 520 and a second aperture 522 respectively. The first aperture 520 is provided at a first end of the first master link 504, whereas the second aperture 522 is provided at a second end of the first master link 504. The first aperture 520 of the first master link 504, the second apertures of the offset link set 408, and the second aperture of the second master link 506 are respectively aligned to receive the cartridge assembly 302 therethrough (see FIG. 2). The first master link 504 includes a first bore 530 and a second bore 532 provided between the first and second apertures 520, 522 respectively. The first and second bores 530, 532 are provided on either sides of a center strut 534. The first master link 504 also includes a first bolt hole 526 and a second bolt hole 528 defined in the body member 508. The first and second bolt holes 526, 528 communicate with the first and second bores 530, 532.

Referring to FIGS. 2 and 4, the connection assembly 400 includes the second pair of straight links 600. The second pair of straight links 600 may have a reversible or a non-reversible link design. In one example, a configuration of the first pair of straight links 500 is different from a configuration of the second pair of straight links 600, meaning the first pair of straight links 500 has a different geometry and construction from that of the second pair of straight links 600. One end of the second pair of straight links 600 is coupled to the first pair of straight links 500.

The second pair of straight links 600 includes a first straight link 606 and a second straight link 608. The first and second straight links 606, 608 may be substantially similar and the following description of the first straight link 606 is equally applicable to the second straight link 608. As shown in FIG. 4, the first straight link 606 includes a body member 610. The body member 610 has a substantially planar first side 612. The body member 610 also includes a second side 614. Further, a central portion 632 having an increased thickness is defined on the second side 614 of the body member 610. Further, the body member 610 includes an upper rail surface 616 and a lower shoe mounting surface 618. The first and second sides 612, 614 include a first aperture 620 and a second aperture 622 defined therethrough. The first aperture 620 is provided at a first end of the first straight link 606, whereas the second aperture 622 is provided at a second end of the first straight link 606. In order to couple the first pair of straight links 500 and the second pair of straight links 600 (see FIG. 2), the first aperture 620 of the first straight link 606 and the second aperture 522 of the first master link 504 is aligned with corresponding apertures of the oppositely disposed second straight link 608 and the second master link 506 to receive the cartridge assembly 302 for a coupling thereof.

Further, another end of the second pair of straight links 600 is coupled to the offset link set 402. For the coupling of the second pair of straight links 600 and the offset link set 402 (see FIG. 2), the first aperture of the offset link 404 and the second aperture 622 of the first straight link 606 is aligned with the corresponding apertures on the oppositely disposed second straight link 608 and the offset link 406 to receive the cartridge assembly 302.

The first straight link 606 further includes a first bore 624 and a second bore 626. The first and second bores 624, 626 are interposed between the first and second apertures 620, 622. The first straight link 606 also includes a first bolt hole 628 and a second bolt hole 630 defined in the body member 610. The first and second bolt holes 628, 630 are positioned within the first and second bores 624, 626, respectively.

It should be noted that the configuration of the offset link sets 402, 408 may be substantially similar to the configuration of the offset link set 202, and the description of the offset link set 202 is equally applicable to the offset link sets 402, 408, without limiting the scope of the present disclosure. Further, the bolt holes, such as the bolt holes 230, 232, 526, 528, 628, 630 provided on the offset link sets 202, the first pair of straight links 500, and the second pair of straight links 600 may be a threaded fastener hole. The bolt holes 230, 232, 526, 528, 628, 630 are configured to receive a fastener in order to attach the track shoes 126 to the tracks 120. The fastener may include any one of a bolt, rivet, pin, screw, and the like.

The offset link sets 202, the first pair of straight links 500, and the second pair of straight links 600 may be made of any metal known in the art having the appropriate properties for the application. In one example, the offset link sets 202, the first pair of straight links 500, and the second pair of straight links 600 may be made of steel, such as carbon steel. Further, the various components of the cartridge assembly 302 may be made of any metal known in the art, such as steel.

INDUSTRIAL APPLICABILITY

The present disclosure relates to the track chain assembly 124 for the undercarriage system 118. The track chain assembly 124 includes a plurality of offset link sets 202, 402, 408 positioned adjacent to and pivotably connected to one another. Further, the connection assembly 400 is used to form the endless loop. The connection assembly 400 includes the first pair of straight links 500 and the second pair of straight links 600. The first pair of straight links 500 is embodied as master links.

The track chain assembly 124 may be used with any known undercarriage track configuration that may lead to a reduction in machine development time and also reduce part numbers associated with the undercarriage system 118. Also, the present disclosure reduces inventory associated with the track chain assembly 124 as straight links may be used in a track chain assembly made of offset link sets, thereby removing the need for offset master link inventory. Further, the track chain assembly 124 provides a structure that maintains structural integrity and load carrying capacity of the track chain assembly 124 to reduce end play.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A track chain assembly for an undercarriage system, the track chain assembly comprising:
a plurality of adjacent offset link sets connected to each other through a pin provided between oppositely disposed offset links, wherein an axis of rotation is defined by the pin, and wherein each of the offset links includes a center portion, a first extension portion extending in a first direction from the center portion, and a second extension portion extending in a second direction from the center portion, the first and second extension portions being offset from one another in an axial direction; and
a connection assembly coupled to a pair of the plurality of offset link sets, the connection assembly configured to connect two ends of the track chain assembly together to form an endless loop, the connection assembly comprising:
a first pair of straight links coupled to one of the pair of the plurality of offset link sets; and
a second pair of straight links coupled to the first pair of straight links and the other of the pair of the plurality of offset link sets, wherein the straight links of the first and second pairs of straight links have a substantially planar first side and a central portion having an increased thickness on a second side, wherein the track chain assembly comprises only two pairs of straight links that are coupled to each other.

2. The track chain assembly of claim 1, wherein a configuration of the first pair of the straight links is different from a configuration of the second pair of the straight links.

3. The track chain assembly of claim 2, wherein each of the first pair of straight links is a master link, the master link having any one of a reversible and a non-reversible link design.

4. The track chain assembly of claim 3, wherein each of the second pair of the straight links has any one of a reversible and a non-reversible link design.

5. The track chain assembly of claim 1 further comprising a cartridge assembly associated with the pin, the cartridge assembly including a bushing.

6. The track chain assembly of claim 5, wherein the bushing is press fitted between oppositely disposed links.

7. The track chain assembly of claim 5 further comprising a lubricated interface provided between the pin and the bushing.

8. A track chain assembly for an undercarriage system, the track chain assembly comprising:
a plurality of adjacent offset link sets connected to each other through a pin provided between oppositely disposed offset links, wherein an axis of rotation is defined by the pin, and wherein each of the offset links includes a center portion, a first extension portion extending in a first direction from the center portion, and a second extension portion extending in a second direction from the center portion, the first and second extension portions being offset from one another in an axial direction; and
a connection assembly coupled to a pair of the plurality of offset link sets, the connection assembly configured to connect two ends of the track chain assembly together to form an endless loop, the connection assembly comprising:
a first pair of straight links coupled to one of the pair of the plurality of offset link sets; wherein the first pair of straight links are master links; and
a second pair of straight links coupled to the first pair of straight links and the other of the pair of the plurality of offset link sets, wherein the straight links of the first and second pairs of straight links have a substantially planar first side and a central portion having an increased thickness on a second side, wherein the track chain assembly comprises only two pairs of straight links that are coupled to each other.

9. The track chain assembly of claim 8 further comprising a cartridge assembly associated with the pin, the cartridge assembly including a bushing.

10. The track chain assembly of claim 9, wherein the bushing is press fitted between oppositely disposed links.

11. The track chain assembly of claim 9 further comprising a lubricated interface provided between the pin and the bushing.

12. A track type machine comprising:
an engine;
an undercarriage system comprising:
a plurality of adjacent offset link sets connected to each other through a pin provided between oppositely disposed offset links, wherein an axis of rotation is defined by the pin, and wherein each of the offset links includes a center portion, a first extension portion extending in a first direction from the center portion, and a second extension portion extending in a second direction from the center portion, the first and second extension portions being offset from one another in an axial direction; and a connection assembly coupled to a pair of the plurality of offset link sets, the connection assembly configured to connect two ends of the track chain assembly together to form an endless loop the connection assembly comprising:

a first pair of straight links coupled to one of the pair of the plurality of offset link sets; and a second pair of straight links coupled to the first pair of straight links and the other of the pair of the plurality of offset link sets, wherein the straight links of the first and second pairs of straight links have a substantially planar first side and a central portion having an increased thickness on a second side, wherein the track chain assembly comprises only two pairs of straight links that are coupled to each other.

13. The track type machine of claim 12, wherein a configuration of the first pair of the straight links is different from a configuration of the second pair of the straight links.

14. The track type machine of claim 13, wherein each of the first pair of straight links is a master link, the master link having any one of a reversible and a non-reversible link design.

15. The track type machine of claim 14, wherein each of the second pair of the straight links has any one of a reversible and a non-reversible link design.

16. The track type machine of claim 12 further comprising a cartridge assembly associated with the pin, the cartridge assembly including a bushing.

17. The track type machine of claim 16, wherein the bushing is press fitted between oppositely disposed links.

18. The track type machine of claim 16 further comprising a lubricated interface provided between the pin and the bushing.

* * * * *